United States Patent
Okabayashi

(10) Patent No.: US 11,651,795 B2
(45) Date of Patent: May 16, 2023

(54) AUDIO SIGNAL PROCESSING DEVICE, AUDIO SYSTEM, AND AUDIO SIGNAL PROCESSING METHOD

(71) Applicant: YAMAHA CORPORATION, Hamamatsu (JP)

(72) Inventor: Masaaki Okabayashi, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 158 days.

(21) Appl. No.: 17/156,698

(22) Filed: Jan. 25, 2021

(65) Prior Publication Data

US 2021/0241799 A1     Aug. 5, 2021

(30) Foreign Application Priority Data

Feb. 4, 2020    (JP) .............................. JP2020-016882

(51) Int. Cl.
    *G06F 3/048*       (2013.01)
    *G11B 27/02*      (2006.01)
                (Continued)

(52) U.S. Cl.
    CPC .......... *G11B 27/02* (2013.01); *G06F 3/04847* (2013.01); *G10L 17/00* (2013.01)

(58) Field of Classification Search
    CPC ...... G06F 3/04847; G10L 17/00; G11B 27/02
    See application file for complete search history.

(56) References Cited

U.S. PATENT DOCUMENTS

| | | | |
|---|---|---|---|
| 2002/0091847 A1* | 7/2002 | Curtin | H04M 3/56 709/205 |
| 2005/0062843 A1* | 3/2005 | Bowers | H04N 7/147 348/E7.084 |

(Continued)

FOREIGN PATENT DOCUMENTS

| | | | | |
|---|---|---|---|---|
| EP | 3018847 A2 * | 5/2016 | | H04H 60/04 |
| EP | 3018847 A2 | 5/2016 | | |

(Continued)

OTHER PUBLICATIONS

Extended European Search Report issued in European Appln. No. 21154007.5 dated Jul. 8, 2021.

(Continued)

*Primary Examiner* — Rashawn N Tillery
(74) *Attorney, Agent, or Firm* — Rossi, Kimms & McDowell LLP

(57) ABSTRACT

An audio signal processing device including: an input reception section that receives input from a user for selection of a channel of a mixing device; an audio signal input section that receives an audio signal corresponding to the channel of the mixing device selected according to the input from the user for the selection of the channel received at the input reception section; an audio source identification section that analyzes the audio signal received at the audio signal input section and identifies a kind of audio source of the audio signal; a setting data acquisition section that acquires setting data corresponding to the kind of audio source identified by the audio source identification section; and a setting data setting section that prompts the mixing device to set the setting data acquired by the setting data acquisition section for the channel received at the input reception section.

20 Claims, 13 Drawing Sheets

(51) Int. Cl.
   *G06F 3/04847*   (2022.01)
   *G10L 17/00*   (2013.01)

(56) References Cited

U.S. PATENT DOCUMENTS

| | | | | |
|---|---|---|---|---|
| 2007/0163428 | A1* | 7/2007 | Salter | G10H 1/0058 84/611 |
| 2008/0082187 | A1* | 4/2008 | Winterstein | G06F 3/16 700/94 |
| 2013/0343548 | A1* | 12/2013 | Leitch | H04R 27/00 381/2 |
| 2014/0344700 | A1* | 11/2014 | Kane | G06F 3/0481 715/726 |
| 2015/0066481 | A1* | 3/2015 | Terrell | H04H 60/04 704/9 |
| 2016/0127826 | A1* | 5/2016 | Chavez | H04R 3/00 381/119 |
| 2016/0371051 | A1* | 12/2016 | Rowe | G06F 3/165 |
| 2019/0215540 | A1* | 7/2019 | Nicol | H04N 21/4223 |
| 2020/0081682 | A1* | 3/2020 | Vestal | H04L 65/611 |
| 2020/0135209 | A1* | 4/2020 | Delfarah | G10L 15/20 |
| 2021/0241799 | A1* | 8/2021 | Okabayashi | G10L 17/00 |

FOREIGN PATENT DOCUMENTS

| | | | | |
|---|---|---|---|---|
| JP | 2017073631 A | | 4/2017 | |
| WO | WO-2014183879 A1 | * | 11/2014 | ............ G06F 3/165 |

OTHER PUBLICATIONS

Office Action issued in Chinese Appln. No. 202110116961.9 dated May 24, 2022. English machine translation provided.

* cited by examiner

AUDIO SIGNAL PROCESSING DEVICE, AUDIO SYSTEM, AND AUDIO SIGNAL PROCESSING METHOD

CROSS REFERENCE TO RELATED APPLICATIONS

This Nonprovisional application claims priority under 35 U.S.C. § 119(a) on Patent Application No. 2020-016882 filed in Japan on Feb. 4, 2020 the entire contents of which are hereby incorporated by reference.

BACKGROUND

Technical Field

The present disclosure relates to audio signal processing.

Background Information

Conventionally, there exist a tablet terminal that carries out a program for settings of an audio signal processing device, and a mixer connected to the tablet terminal (for example, Japanese Patent Application Publication No. 2017-073631).

The mixer disclosed in Japanese Patent Application Publication No. 2017-073631 receives, from the tablet, mixing data indicating appropriate mixing for an audio signal of the audio source, such as a musical instrument or the like, selected by the user. When the user operates the tablet terminal, the name of the musical instrument displayed on the tablet terminal (instrument icon) becomes associated with a member (channel). The mixer assigns the mixing data for the musical instrument associated with the member.

SUMMARY

The program disclosed in Japanese Patent Application Publication No. 2017-073631 is for beginning mixer users. In the program disclosed in Japanese Patent Application Publication No. 2017-073631, the user is never requested to select a channel. In other words, the program disclosed in Japanese Patent Application Publication No. 2017-073631 is not to set mixing data, such as a name, signal processing parameters, etc., for a channel selected by the user. A mixer that is not for begging users, unlike the mixer disclosed in Japanese Patent Application Publication No. 2017-073631, receives selection of a channel from the user and sets mixing data for the channel for each time. With such a mixer, it may take a long time to set mixing data for each channel.

An object of an embodiment of the present disclosure is to shorten the time to set mixing data for each channel.

An audio signal processing device according to an embodiment of the present disclosure includes: an input reception section that receives input from a user for selection of a channel of a mixing device; an audio signal input section that receives an audio signal corresponding to the channel of the mixing device selected according to the input from the user for the selection of the channel received at the input reception section; an audio source identification section that analyzes the audio signal received at the audio signal input section and identifies a kind of audio source of the audio signal; a setting data acquisition section that acquires setting data corresponding to the kind of audio source identified by the audio source identification section; and a setting data setting section that prompts the mixing device to set the setting data acquired by the setting data acquisition section for the channel of the mixing device selected according to the input from the user for the selection of the channel received at the input reception section.

The embodiment of the present disclosure makes it possible to shorten the time to set mixing data for each channel.

DETAILED DESCRIPTION

Figure 1:
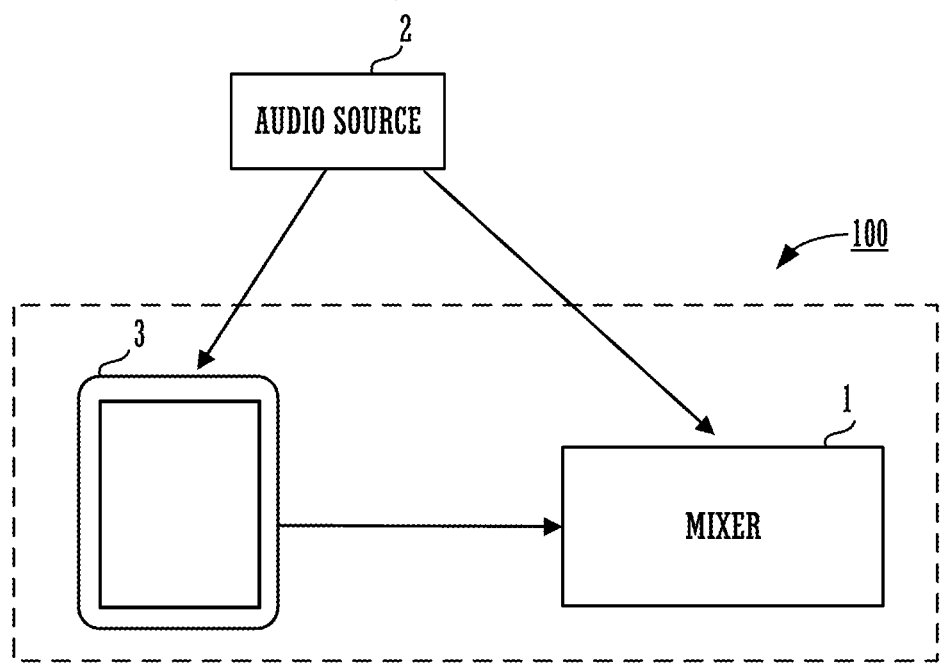
FIG. 1 is a configuration diagram showing main components of an audio system.

FIG. 1 is a configuration diagram showing main components of an audio system 100. As shown in FIG. 1, the audio system 100 includes a mixer (mixing device) 1, and a tablet terminal (which will hereinafter be referred to simply as a tablet) 3. The tablet 3 in this embodiment is an example of an audio signal processing device according to the present disclosure.

Figure 2:
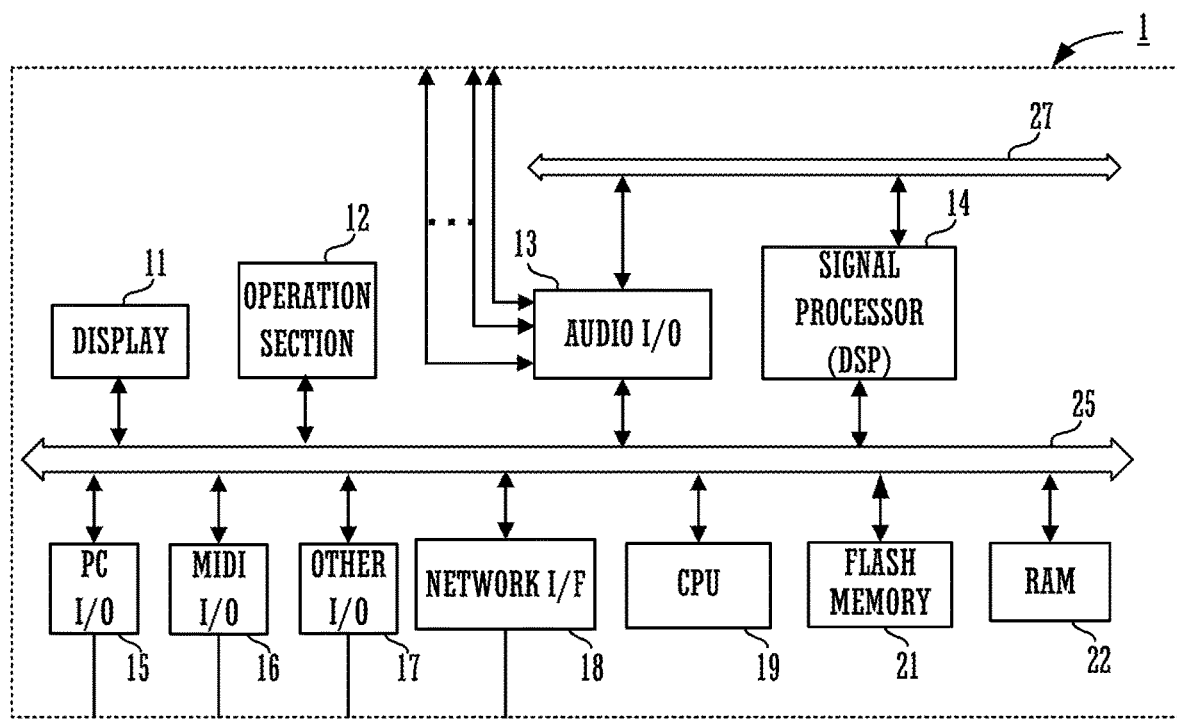
FIG. 2 is a configuration diagram showing main components of a mixer.

FIG. 2 is a block diagram showing main components of the mixer 1. As shown in FIG. 2, the mixer 1 includes a display 11, an operation section 12, au audio I/O (input/output) 13, a signal processor 14, a PC-I/O 15, a MIDI-I/O 16, an other-I/O 17, a network I/F 18, a CPU 19, a flash memory 21, and a RAM 22.

The display 11, the operation section 12, the audio I/O (input/output) 13, the signal processor 14, the PC-I/O 15, the MIDI-I/O 16, the other-I/O 17, the network I/F 18, the CPU 19, the flash memory 21, and the RAM 22 are connected to one another via a bus 25. The audio I/O 13 and the signal processor 14 are also connected to a waveform bus 27 for transmitting an audio signal.

The audio I/O 13 is an interface for reception of an audio signal to be processed by the signal processor 14. The audio I/O 13 includes an analog input port, a digital input port or the like where an audio signal from an audio source 2 is received. The audio I/O 13 is also an interface for output of an audio signal after processed by the signal processor 14. The audio I/O 13 includes an analog output port, a digital output port or the like.

The PC-I/O 15, the MIDI-I/O 16 and the other-I/O 17 are interfaces for connection and communication with various external devices. To the PC-I/O 15, for example, a data processing device, such as a personal computer or the like, is connected. To the MIDI-I/O 16, for example, a device compatible with a MIDI, such as a physical controller, an electric musical instrument, or the like, is connected. To the other-I/O 17, for example, a display is connected. Alternatively, to the other-I/O 17, a UI (user interface) device, such as a mouse, a keyboard, or the like, is connected. As the standard for communication with such external devices, any standard, such as the Ethernet (registered trademark), USB (universal serial bus), or the like, can be used. The connection may be wired or wireless connection.

The network I/F 18 communicates with the tablet 3 via a network. The network I/F 18 receives mixing data, which will be described later, from the tablet 3 via the network.

The CPU is a control section that controls the operation of the mixer 1. The CPU 19 reads out a specified program stored in the flash memory 21, which is a storage section, to the RAM 22, and performs various operations. The program is not necessarily stored in the flash memory 21 of the mixer 1 itself. For example, the program may be downloaded from another device, such as a server or the like (not shown), and read out to the RAM 22 when necessary.

The display 11 displays various data thereon under control of the CPU 19. The display 11 is, for example, an LCD (liquid crystal display), a display using LEDs (light emitting diodes), or the like.

The operation section 12 receives input from a user for operation of the mixer 1. The operation section 12 includes keys, buttons, a rotary encoder or fader (slider), etc. The operation section 12 is in the form of a touch panel stacked on the LCD that serves as the display 11.

The signal processor 14 includes one or more DSPs (digital signal processors) that perform various kinds of signal processing, such as mixing, effect, etc. The signal processor 14 performs mixing, effect and other kinds of signal processing of an audio signal sent from the audio I/O 13 through the waveform bus 27. The signal processor 14 outputs a signal-processed digital audio signal back to the audio I/O 13 through the waveform bus 27.

The mixer 1 receives input from the user and performs signal processing of an audio signal inputted thereto, as needed. The mixer 1 also receives mixing data for each channel from the tablet 3. The mixing data in this embodiment corresponds to setting data according to the present disclosure.

Figure 3:
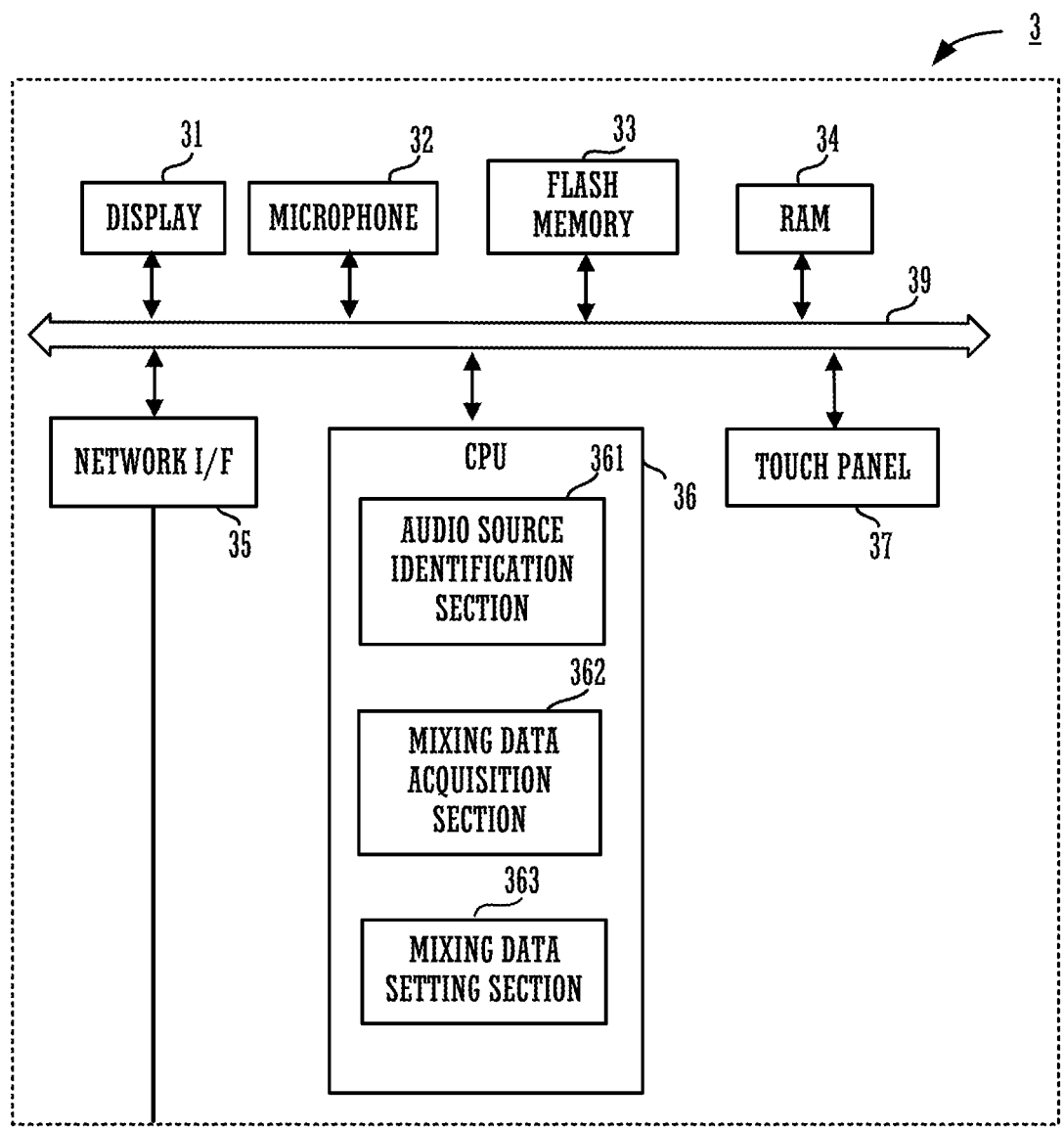
FIG. 3 is a configuration diagram showing main components of a tablet.
Figure 4:
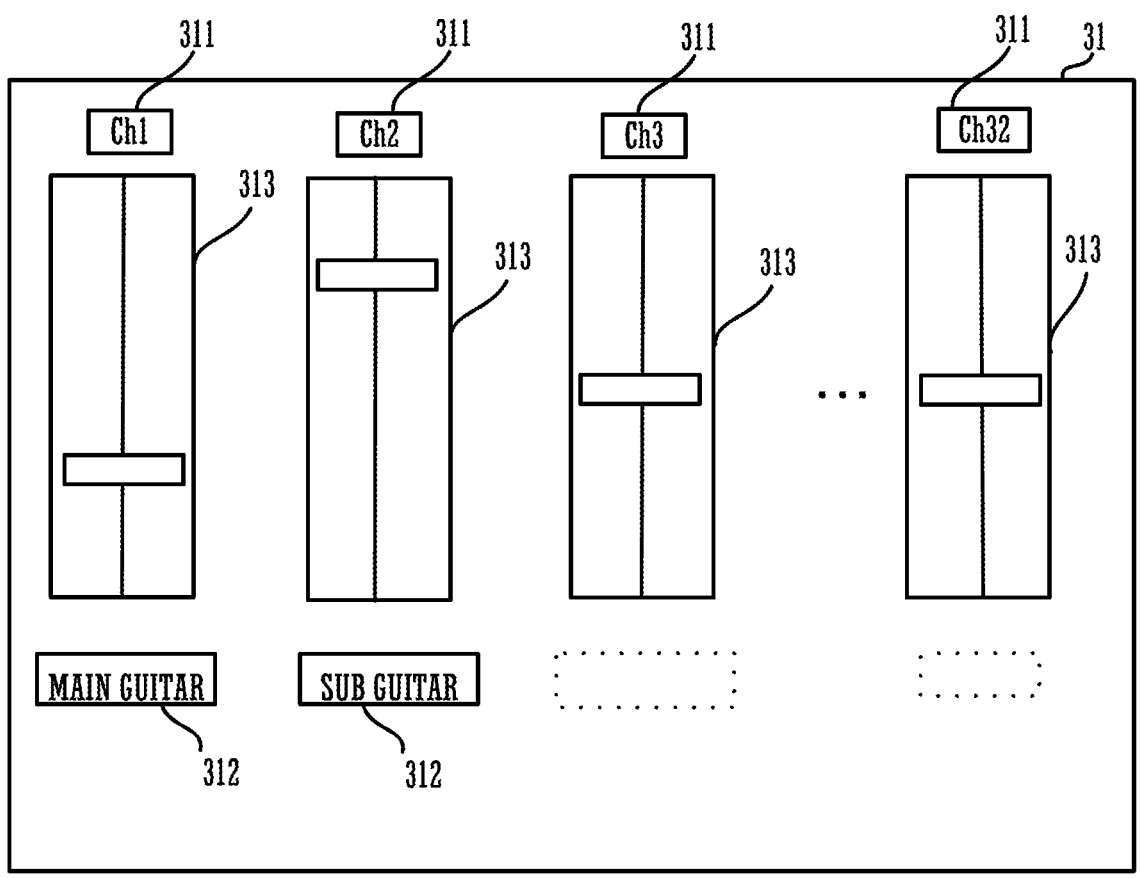
FIG. 4 is an illustration diagram showing an exemplary picture displayed on a display of the tablet.

With reference to the drawings, the tablet 3 is described. FIG. 3 is a block diagram showing main components of the tablet 3. FIG. 4 shows an exemplary picture displayed on a display 31 of the tablet 3.

As shown in FIG. 3, the tablet 3 includes a display 31, a microphone 32, a flash memory 33, a RAM 34, a network I/F 35, a CPU 36, and a touch panel 37. The display 31, the microphone 32, the flash memory 33, the RAM 34, the network I/F 35, the CPU 36, and the touch panel 37 are connected to one another via a bus 39. The network I/F 35 in this embodiment corresponds to a communication section according to the present disclosure. The microphone 32 in this embodiment is an example of an audio signal input section according to the present disclosure.

The network I/F 35 communicates with the mixer 1 via a network. The network I/F 35 sends mixing data appropriate for the audio signal to the mixer 1.

The display 31 displays various kinds of data under control of the CPU 36. The display 31 is, for example, an LCD. The picture shown in FIG. 4 is a picture for send level settings of discrete input channels to a MIX bus. As shown in FIG. 4, the display 31 displays, on its screen, channel buttons 311, channel name field 312, and faders 313 for the respective channels. The display 31 displays, for example, "MAIN GUITAR", "SUB GUITAR", etc. as the channel names. The display 31 also displays the faders 313 corresponding to the respective channel name field 312. Each of the faders 313 indicates a send level at which an audio signal for the channel named as "MAIN GUITAR", "SUB GUITAR" or the like is to be outputted to the MIX bus.

The touch panel 37 is stacked on the LCD that serves as the display 31, and forms a GUI (graphical user interface). The touch panel 37 receives various kinds of input from a user. For example, when the user selects (presses) one of the channel buttons 311, the touch panel 37 receives a channel selection. The touch panel 37 in this embodiment is an example of an input reception section according to the present disclosure.

The microphone 32 receives an audio signal from the audio source 2.

The flash memory 33 stores various programs for execution of audio signal processing.

The flash memory 33 stores kinds of audio sources and mixing data for the respective kinds of audio sources. The kinds of audio sources are, for example, names of musical instruments (including vocal). The mixing data in this embodiment includes a channel name, signal processing data, etc. needed for processing of an audio signal. The signal processing data, for example, includes at least one kind of the following: data indicating the kind of effect used for each channel; data indicating the gain of each channel and the destination of the audio data for each channel; and signal processing parameters, such as a send level, a parameter for effect (delay), etc.

The flash memory 33 stores characteristic data indicating the feature amounts of the timbre (amplitude waveform, spectrum, kepstrum, etc.) of each kind of musical instrument (each name of musical instrument) beforehand.

The CPU 36 reads out an OS and an application program for operation from the flash memory 33 to the RAM 34 and overall controls the tablet 3. The program read out by the CPU 36 is not necessarily stored in the flash memory 33 inside the tablet 3 itself. For example, the program may be stored in a storage medium of an external device, such as a server or the like. In this case, the CPU 36 reads out the program from the server (not shown) to the RAM 34 and executes the program when necessary.

The CPU 36 includes an audio source identification section 361, a mixing data acquisition section 362, and a mixing data setting section 363. The CPU 36 executes the application program and thereby reads out programs for audio source identification, mixing date acquisition and mixing data settings from the flash memory 33 to the RAM 22. In this way, the CPU 36 configures the audio source identification section 361, the mixing data acquisition section 362, and the mixing data setting section 363. The mixing data acquisition section 362 in this embodiment corresponds to a setting data acquisition section according to the present disclosure. The mixing data setting section 363 is an example of a setting data setting section according to the present disclosure.

The audio source identification section 361 analyzes the audio signal inputted to the microphone 32 and identifies the kind of audio source, for example, the name of musical instrument, such as an electric guitar, a drum, a vocal, or the like. More specifically, when the audio source identification section 361 receives an audio signal, the audio source identification section 361 performs an identification process, such as an analysis of the audio signal waveform, pattern matching, etc. The identification process includes analyzing the audio signal inputted to the tablet 3 and generating characteristic data. For example, the audio source identification section 361 calculates correlation values between the generated characteristic data and respective sets of characteristic data stored in the flash memory 33. The audio source identification section 361 finds out a correlation value higher than a predetermined threshold value from among the plurality of correlation values and identifies the kind of musical instrument corresponding to the set of characteristic data as the kind of musical instrument that is the source of the inputted audio data.

The mixing data acquisition section 362 reads out mixing data corresponding to the kind of audio source identified by the audio source identification section 361 from the flash memory 33. In this embodiment, the flash memory 33 stores mixing data (channel name, gain, destination, send level, etc.) for each kind of audio source (name of musical instrument) as set by the user in the past. For example, when the kind of audio source identified by the audio source identification section 361 is an electric guitar, the mixing data acquisition section 362 reads out and acquires a channel name corresponding to electric guitar (for example, MAIN GUITAR) from the flash memory 33. For example, the mixing data acquisition section 362 also acquires data for an electric guitar about gain, destination, send level, etc.

The mixing data setting section 363 associates the mixing data acquired by the mixing data acquisition section 362 with the channel received (selected by the user) on the touch panel. For example, the mixing data setting section 363 associates the channel name "MAIN GUITAR" with Channel 1. Also, the mixing data setting section 363 associates the data about gain, destination, send level, etc. with Channel 1. Thereafter, the mixing data setting section 363 sends the mixing data (data indicating a channel name, data indicating a gain, data indicating a destination and a send level, etc.) associated with Channel 1 to the mixer 1 via the network I/F 35. In this way, the mixing data setting section 363 prompts the mixer 1 to set the acquired mixing data (for example, about channel name, gain, destination, send level, etc.) for the channel received on the touch panel 37 (for example, Channel 1).

Figure 5:
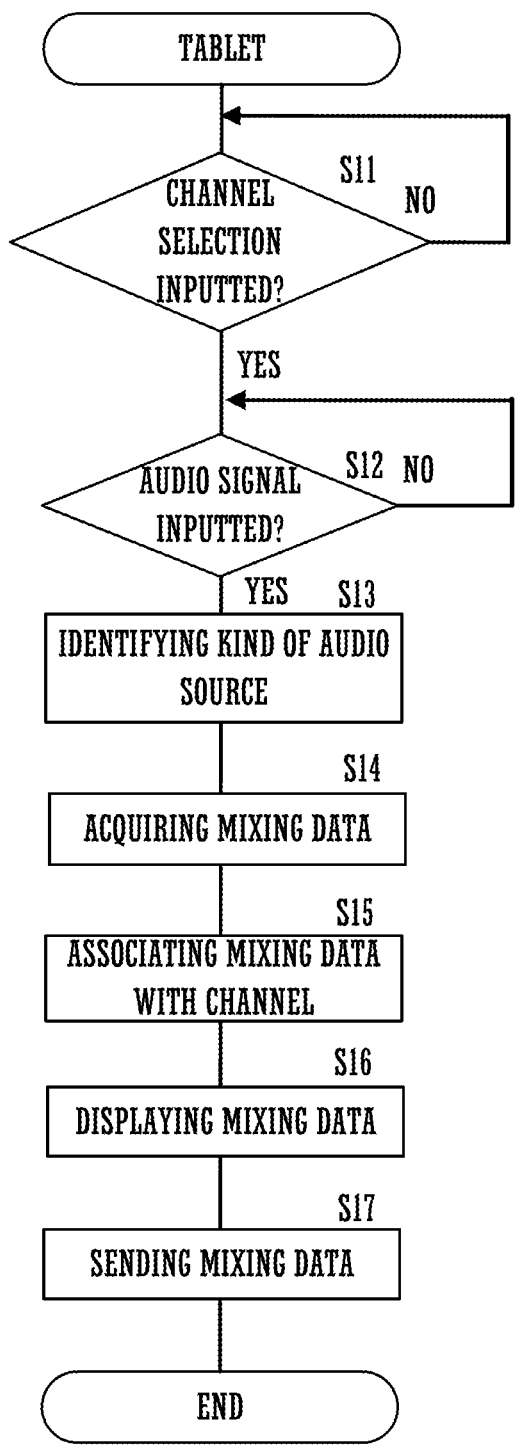
FIG. 5 is a flowchart showing an example of audio signal processing carried out by the tablet.

With reference to FIG. 5, audio signal processing performed by the tablet 3 is described. FIG. 5 is a flowchart showing an example of audio signal processing carried out by the tablet 3.

When the tablet 3 receives the user's selection of a channel (Channel 1) on the touch panel 37 (YES at S11), the tablet 3 receives an audio signal through the microphone 32 (S12). The user or performer plays a musical instrument corresponding to Channel 1. The tablet 3 receives the sound of the musical instrument through the microphone 32. The audio source identification section 361 of the tablet 3 identifies the kind of audio source (the name of musical instrument) of the inputted audio signal. Specifically, the audio source identification section 361 of the tablet 3 analyzes the waveform of the inputted audio signal and identifies the name of musical instrument from the analysis result (S13).

The tablet 3 reads out, from the flash memory 33, mixing data (about channel name, gain, destination, send level, etc.) corresponding to the name of musical instrument of the inputted audio signal (S14). The tablet 3 associates the mixing data read out from the flash memory 33 with the channel selected by the user (S15). The tablet 3 displays, on the display 31, the channel name field 312 corresponding to the channel selected by the user, and changes the position of the fader 313 in accordance with the send level to the MIX bus (S16) (see FIG. 4). The tablet 3 sends the mixing data associated with the channel selected by the user to the mixer 1 (S17).

The above-described process is merely an example, and the audio signal processing is not limited to this. The tablet 3 may carry out the process with the steps S16 and S17 interchanged. The audio signal processing carried out by the tablet 3 is not limited to processing of an audio signal inputted through the microphone 32. The tablet 3 may receive an audio signal directly from a musical instrument at an audio signal I/F (not shown).

Conventionally, a user sets mixing data, such as channel names, for discrete channels (for example, Channel 1 and Channel 2) beforehand, for example, before a rehearsal. In this case, the user identifies a musical instrument from the sound in each channel and sets a channel name corresponding to the identified musical instrument. However, it takes much time and labor to manually set mixing data, such as a channel name, etc., for each channel before every rehearsal.

With the tablet 3 according to the present embodiment, once the user associates a name of musical instrument with mixing data and stores them in the memory, when the sound of audio source is inputted to the tablet 3 thereafter, the mixer 1 is automatically controlled to set the mixing data for the channel selected by the user. Thus, it is no longer necessary for the user to manually set mixing data, and it is possible to shorten the time for setting mixing data for each channel.

[Modification 1]

Figure 6:
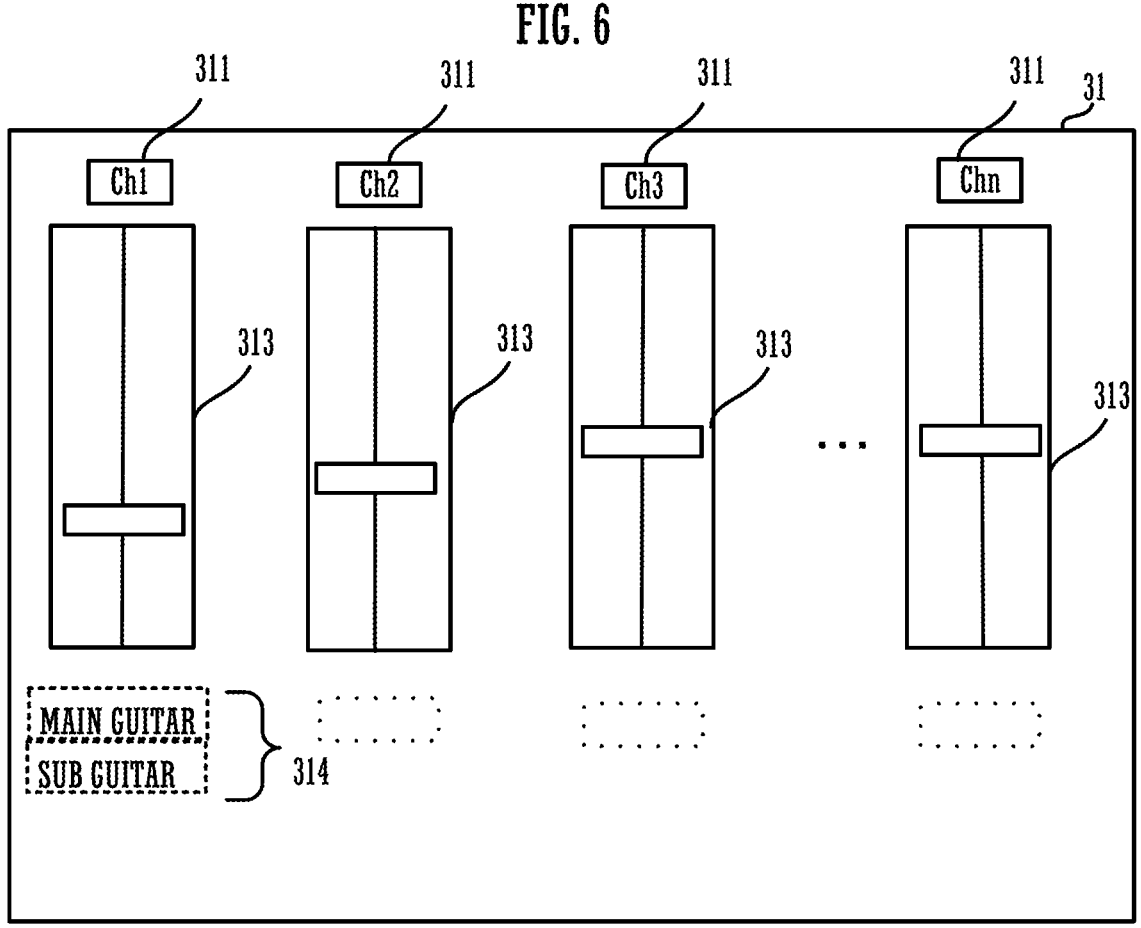
FIG. 6 is an illustration diagram showing a picture for selection of a set of mixing data among from a plurality of sets of mixing data according to Modification 1.
Figure 7:
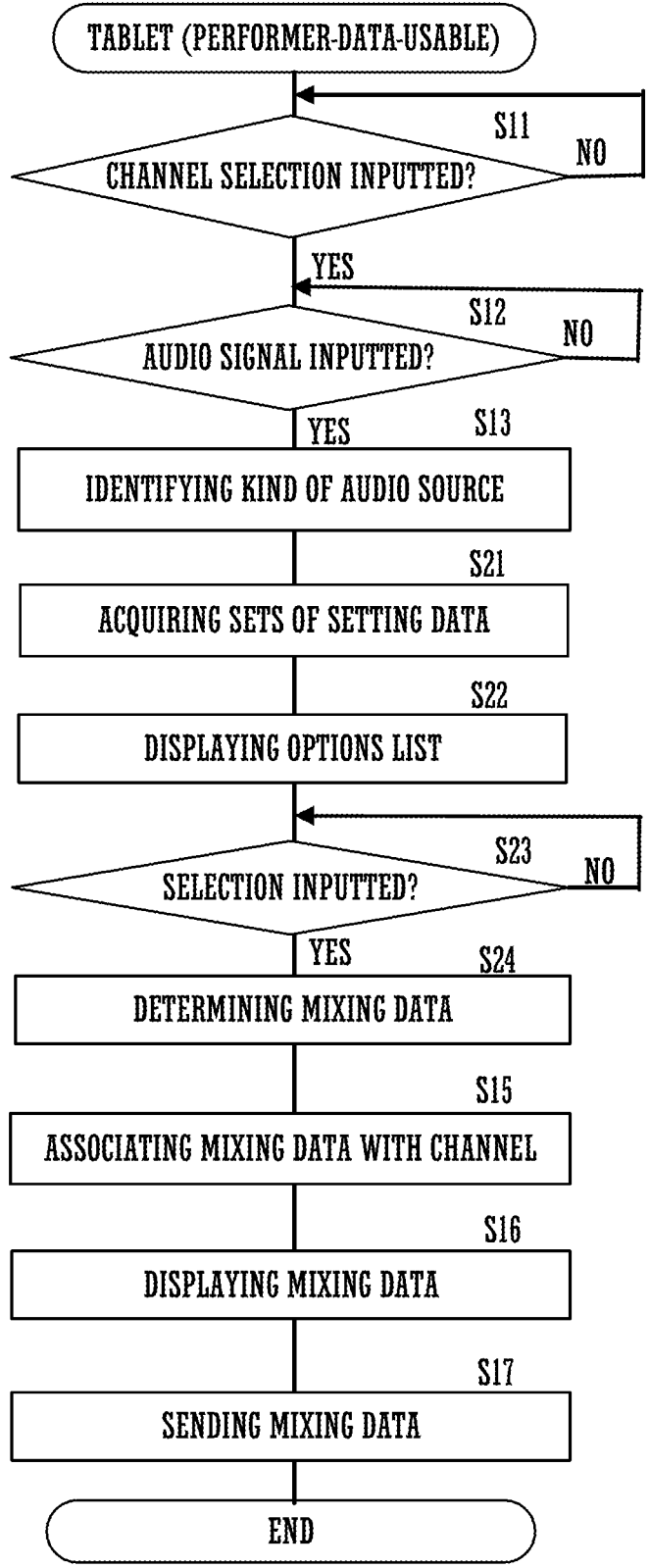
FIG. 7 is a flowchart showing audio signal processing when there are some options for mixing data.

A tablet 3 according to Modification 1 will be described with reference to FIGS. 6 and 7. FIG. 6 is an illustration diagram showing a picture for selection from among a plurality of sets of mixing data. FIG. 7 is a flowchart showing audio signal processing for selection from among a plurality of sets of mixing data. The same members as described in connection with the tablet 3 according to the embodiment will be provided with the same reference signs, and the descriptions will be omitted.

When the mixing data acquisition section 362 acquires a plurality of sets of mixing data corresponding to a plurality of kinds of musical instruments (names of musical instruments), the mixing data setting section 363 prompts the mixer 1 to set mixing data selected by the user.

More specifically, when the mixing data acquisition section 362 acquires a plurality of sets of mixing data for a kind of musical instrument (a name of musical instrument), the mixing data setting section 363 displays a plurality of options (candidates for mixing data), which will hereinafter be referred to as an options list 314, on the display 31. The user selects a desirable set of mixing data from the displayed options list 314.

In a case in which the user, in the past, set two different channel names (MAIN GUITAR and SUB GUITAR) for one name of musical instrument (for example, electric guitar) and set different sets of signal processing data for the respective channel names, the processing according to this modification is performed as follow. In this case, the channel names MAIN GUITAR and SUB GUITAR, and sets of signal processing data for these respective channel names are already stored in the flash memory 33.

For example, as shown in FIG. 6, the display 31 displays an options list 314 under the fader 313. In this case, when the user presses one of the options "MAIN GUITAR" or "SUB GUITAR" displayed on the display 31, the mixing data setting section 363 prompts the display 31 to display only the channel name pressed by the user. The mixing data setting section 363 prompts the mixer 1 to set the mixing data corresponding to the channel name pressed (selected) by the user for the channel selected by the user.

Audio signal processing when there are a plurality of sets of mixing data for a name of musical instrument is described with reference to FIG. 7.

When the tablet 3 receives the user's selection of a channel and receives an audio signal (YES at S11 and YES at S12), the tablet 3 identifies the kind of audio source (name of musical instrument) (S13). When the tablet 3 acquires a plurality of sets of mixing data for the identified name of musical instrument (S21), the tablet 3 displays, on the screen, an options list 314 indicating a plurality of channel names corresponding to the name of musical instrument (S22). When the tablet 3 receives the user's selection of a channel name (YES at S23), the tablet 3 determines the channel name selected by the user (for example, MAIN GUITAR) as a channel name of the channel selected by the user (for example, Channel 1). Then, in accordance with the determined channel name (for example, MAIN GUITAR), mixing data are determined (S24). The tablet 3 associates the mixing data with the channel selected by the user (for example, Channel 1) (S15). The tablet 3 displays, on the display 31, the channel name field 312 selected by the user as a name of the channel selected by the user, and changes the position of the fader 313 in accordance with the send level (S16). The tablet 3 sends the mixing data selected by the user to the mixer 1 (S17).

As described above, when the tablet 3 according to Modification 1 acquires a plurality of sets of mixing data for one kind of musical instrument, the tablet 3 determines one of the sets of mixing data as appropriate mixing data in accordance with the user's selection. In this way, the tablet 3 can set mixing data for a channel more appropriately for the kind of musical instrument.

In the above description of Modification 1, a case in which there are a plurality of sets of mixing data for an electric guitar has been described. However, Modification 1 is not limited to an electric guitar.

[Modification 2]

Figure 8:
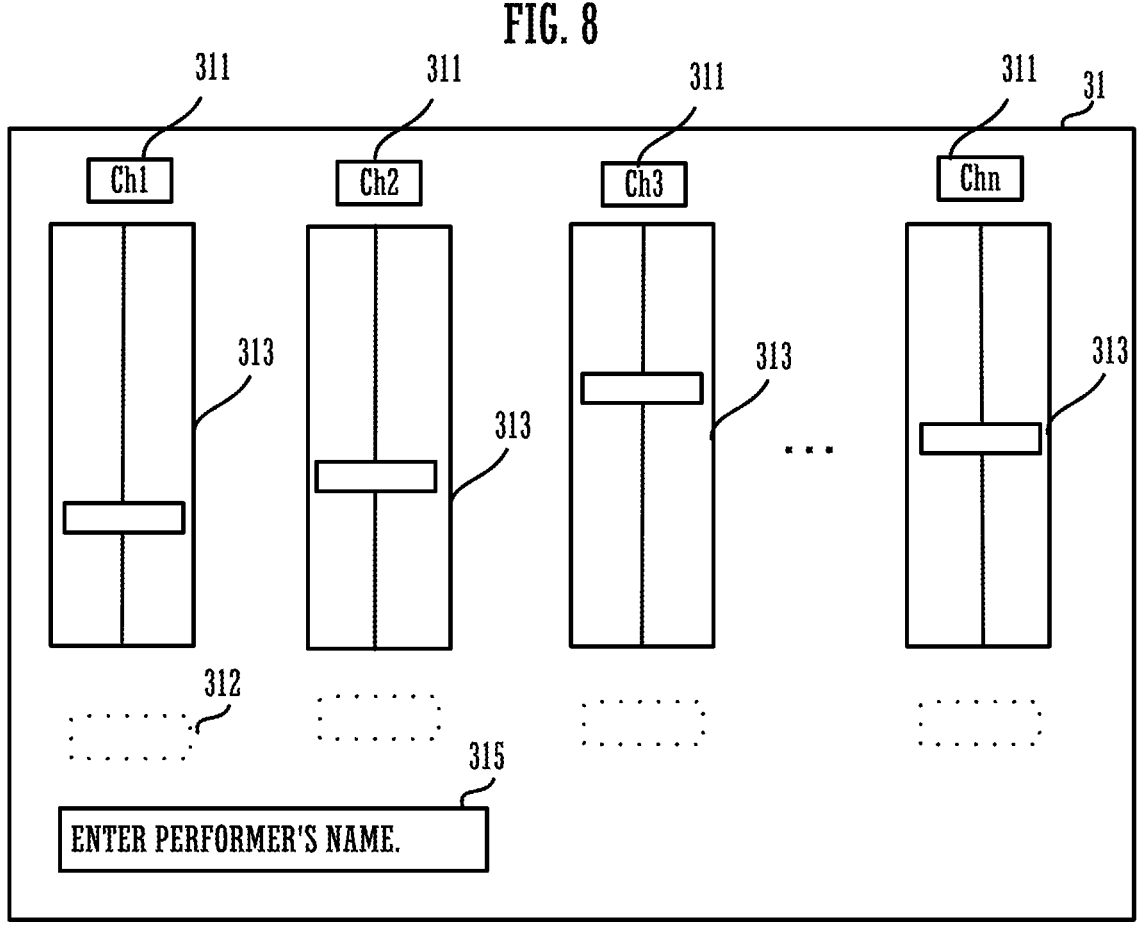
FIG. 8 is an illustration diagram showing a picture for selection of mixing data displayed on a display according to Modification 1.
Figure 9:
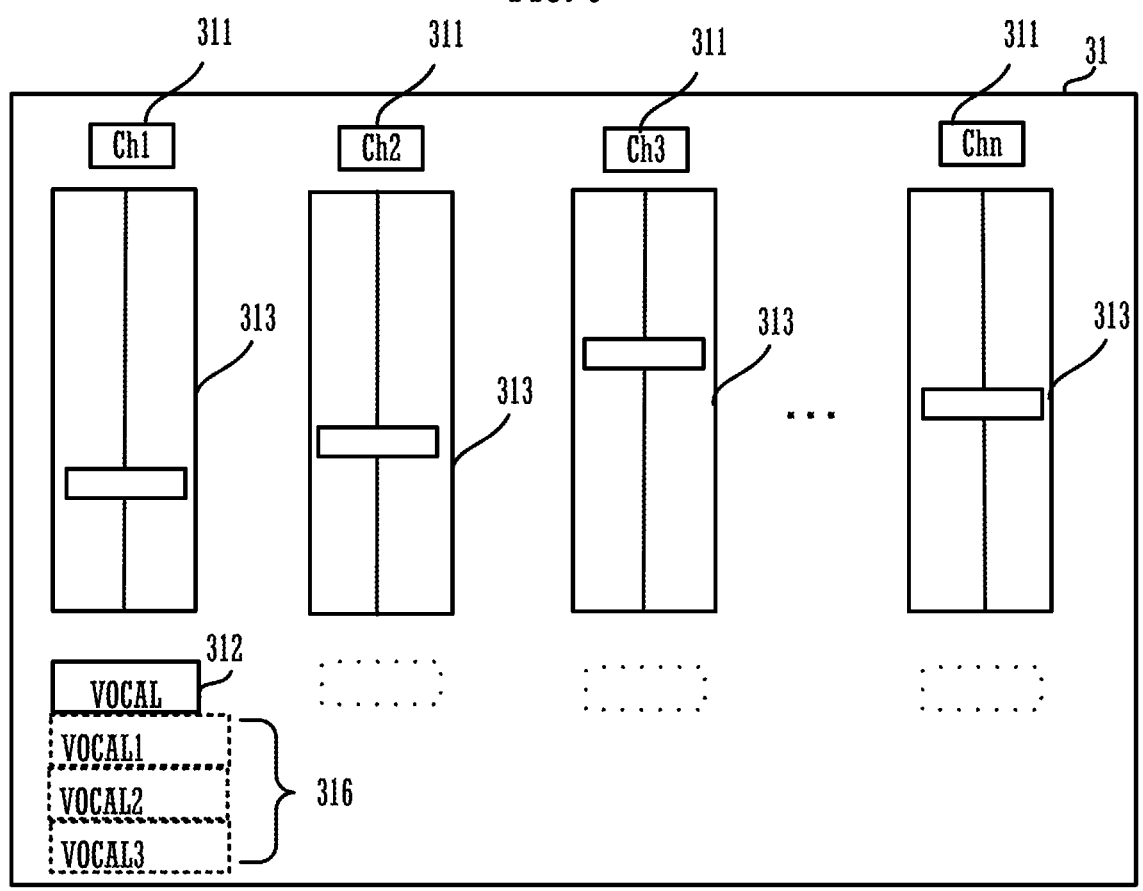
FIG. 9 is an illustration diagram showing a picture for selection of mixing data based on a performer's name.

With reference to FIGS. 8 and 9, Modification 2 will be described in connection with a case in which mixing data are set in accordance with a kind of musical instrument (a name of musical instrument) and performer data (a performer's name). The same members as described in connection with the tablet 3 according to the embodiment will be provided with the same reference signs, and the descriptions will be omitted.

FIG. 8 is an illustration diagram showing an exemplary picture displayed on the display 31 in Modification 2. FIG. 9 is an illustration diagram showing an exemplary picture for selection of mixing data based on a performer's name.

In this example, each set of mixing data is already stored in the flash memory 33, associated with not only a name of musical instrument identified in the past but also a performer's name (for example, JOHN) inputted by the user in the past. The tablet 3 sets mixing data (about a channel name (for example, MAIN-VOCAL JOHN), a gain, a destination, a send level, etc.) based on the combination of the identified name of musical instrument and the received performer's name.

The audio source identification section 361 identifies the name of musical instrument of an audio signal inputted through the microphone 32 as VOCAL, for example. The user enters a performer's name (in this example, JOHN) in an entry field 315 in the picture as shown in FIG. 8. The touch panel 37 receives the performer's name the user has entered in the entry field 315. The mixing data acquisition section 362 reads out mixing data corresponding to the combination of the identified name of musical instrument and the received performer's name from the flash memory 33. The display 31 may temporarily display the name of musical instrument in the channel name field 312 until the performer's name has been determined by the user's operation.

When the mixing data are read out, the display 31 displays a channel name in the channel name field 312 in the picture. In this case, the channel name is a name set by the user in the past, such as "MAIN-VOCAL JOHN", which is a combination of the name of musical instrument (VOCAL) and the performer's name (for example, JOHN), etc.

Mixing data corresponding to a kind of musical instrument differ depending on the performer who plays the musical instrument. In this example, the tablet 3 allows the user to enter (or select) a performer's name, and acquires mixing data corresponding to the combination of the name of musical instrument of the audio signal inputted thereto and the performer's name selected by the user. Thus, the tablet 3 acquires mixing data corresponding to the combination of a name of musical instrument and a performer's name, which makes it possible to improve accuracy of the channel name of the used channel and the parameters.

The display 31 may display a performers list 316 listing one or more performers' names the user entered before. Different sets of mixing data are associated with the respective performers' names that were entered before. In the performers list 316, as shown in FIG. 9, for example, "JOHN" is indicated as VOCAL 1, "MIKE" is indicated as VOCAL 2, and "TOM" is indicated as VOCAL 3. In this case, after the audio source identification section 361 identifies the name of musical instrument of the inputted audio signal, the mixing data acquisition section 362 reads out, from the flash memory 33, performers' names corresponding to the name of musical instrument and different sets of mixing data corresponding to the combinations of the name of musical instrument with the performers' names.

When there are a plurality of sets of mixing data corresponding to combinations of the identified name of musical instrument with performers' names, the mixing data setting section 363 prompts the display 31 to display a performers list 316 so that the user can make selection from the list to obtain an appropriate set of mixing data. The user selects a performer's name from the performers list 316. The mixing data setting section 363 determines the mixing data corresponding to the combination of the performer's name selected by the user and the name of musical instrument as appropriate mixing data. The mixing data setting section 363 prompts the mixer 1 to set the determined mixing data for the channel selected by the user (for example, Channel 1). After the name of musical instrument is identified, the display 31 may temporarily display the name of musical instrument in the channel name field 312 until the performer's name is determined by the user's selection.

Thus, the tablet 3 allows the user to enter or select a performer's name, which makes it possible to set mixing data for a channel as desired by the user. With the tablet 3, the user no longer needs to directly input (set) mixing data. Accordingly, it is possible to prevent the user's input errors and to shorten the time for data settings.

Figure 10:
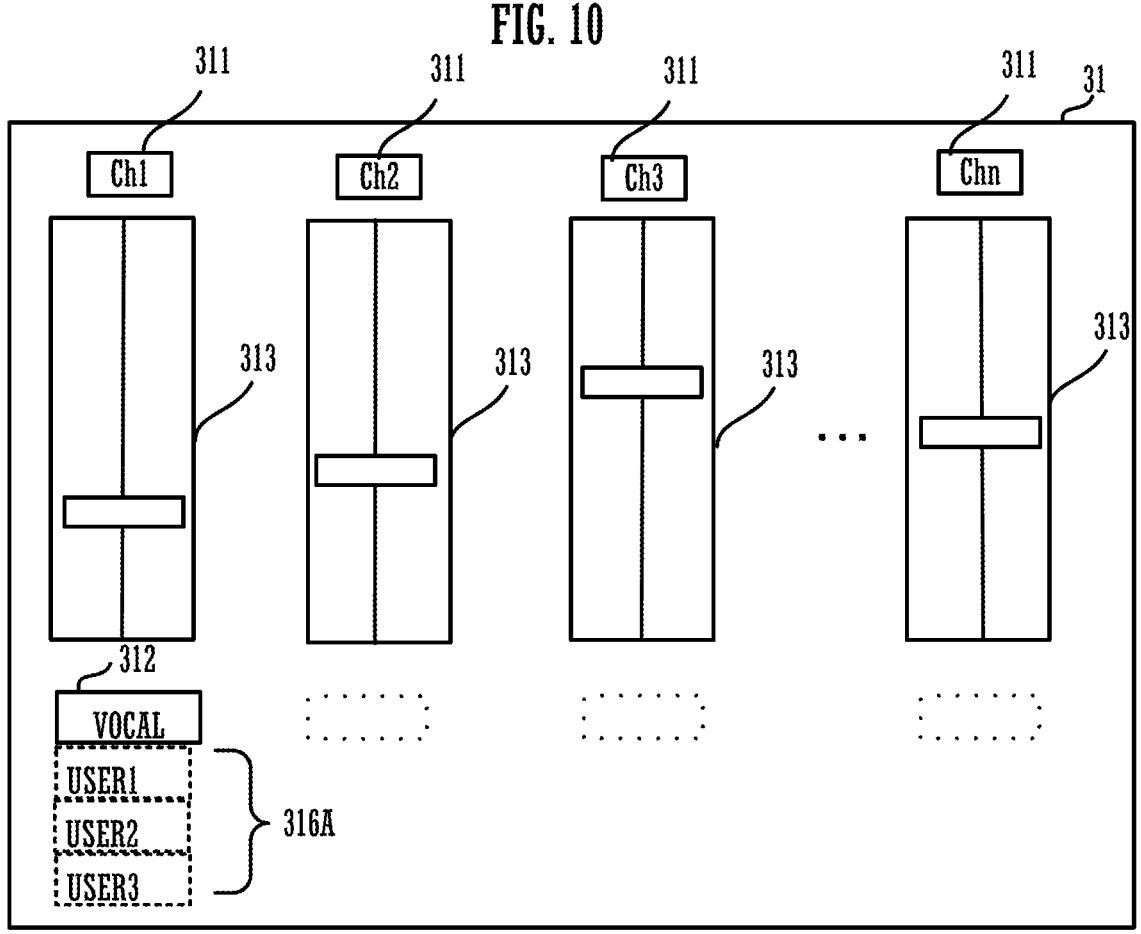
FIG. 10 is an illustration diagram showing a picture for selection of mixing data based on a user's name.

FIG. 10 is an illustration diagram showing a picture for selection of mixing data based on a user's name.

The tablet 3 may make the mixer 1 set mixing data by using a user's name instead of a performer's name. In this case, as in the case of using a performer's name, the display 31 displays a user's name entry field (not shown) where the user is to enter his/her name. As shown in FIG. 10, the display 31 may display a users list 316A under the channel name field 312. In this case, in the users list 316A, for example, "ANDY" is indicated as USER 1, "MIA" is indicated as USER 2, and "LISA" is indicated as USER 3. The touch panel 37 receives a user's name entered or selected by the user. The mixing data setting section 363 acquires or determines mixing data corresponding to the combination of the entered user's name and the name of musical instrument. The mixing data setting section 363 prompts the display 31 to display the acquired or determined channel name in the channel name field 312. The mixing data setting section 363 prompts the mixer 1 to set the acquired or determined mixing data for the channel selected by the user (for example, Channel 1). After the name of musical instrument is identified, the display 31 may temporarily display the name of musical instrument until the user selects a user's name.

Mixing data corresponding to a kind of musical instrument differ depending on the user who uses the mixer 1. In this example, the tablet 3 allows the user to enter (or select) a user's name, and acquires mixing data corresponding to the combination of the name of musical instrument of the audio signal inputted thereto and the user's name selected by the user. Thus, the tablet 3 acquires mixing data corresponding to the combination of a name of musical instrument and a user's name, which makes it possible to improve accuracy of the channel name of the used channel and the parameters.

The tablet 3 according to Modification 2 may be configured such that the user can enter (select) not only performer data and user data but also data about the performance venue, data about the user's tablet, etc. In this case, mixing data are already stored in the flash memory 33 associated with data about performance venues that were inputted by the user before. The mixing data acquisition section 362 reads out, from the flash memory 33, mixing data corresponding to the combination of a performance venue and the name of musical instrument or mixing data corresponding to the combination of a set of tablet data and the name of musical instrument.

Mixing data are already stored in the flash memory 33 associated with tablet data that were inputted by the user before. In this case, the mixing data acquisition section 362 reads out, from the flash memory 33, mixing data corresponding to a combination of a set of tablet data and the name of musical instrument.

The performer data and the user data are not limited to names and may be face photos, etc. In this case, the performers and users take face photos, for example, by using the camera function of the tablet 3. The tablet 3 sets the face photos and mixing data in the mixer 1. From that point onwards, the user takes a face photo of the performer or the user himself/herself by using the tablet 3, and when the face photo is identical with any one of the face photos that were set associated with mixing data in the past, the tablet 3 prompts the mixer 1 to set mixing data corresponding to the combination of the name of musical instrument and the face photo for the channel selected by the user.

[Modification 3]

A tablet 3 according to Modification 3 will be described. The tablet 3 according to Modification 3 selects appropriate mixing data by a specific algorithm (AI: artificial intelligence), such as a neural network or the like. The tablet 3 has a learning function to construct an algorithm.

The tablet 3 automatically selects (generates) mixing data based on the history or the settings previously made by the user.

The tablet 3 operates at different stages, namely, at a learning stage and an application stage. At the learning stage, the tablet 3 trains a model of selection of mixing data, and at the application stage, the tablet 3 selects mixing data by using the model (learned model) that the tablet 3 obtained through the learning stage.

An example of using the learning stage and the application stage will be described.

The following is a description in connection with a case in which the tablet 3 selects mixing data based on the kind of musical instrument identified by the audio source identification section 361. At the learning stage, the tablet 3 uses the kind of musical instrument as an element of input data. The tablet 3 also uses mixing data (about a channel name, a gain, a destination, a send level, etc.) as elements of output data. The tablet 3 trains a model of selection of mixing data by using combination data of these input data and output data as teaching data.

At the application stage of using the learned model, the mixing data acquisition section 362 uses the kind of musical instrument identified by the audio source identification section 361 as input data to the learned model, and acquires mixing data from output data from the learned model. The mixing data setting section 363 sends the acquired mixing data to the mixer 1.

The model to be used for the learning may be one that applies weighting, for example, in accordance with the setting frequency. For example, the tablet 3 has counted how often each set of mixing data of some sets of mixing data has been used for a kind of musical instrument (for example, GUITAR), and the tablet 3 sends a frequently used set of mixing data to the mixer 1.

A support vector machine or a neural network may be applied to the model. As the neural network, a DNN (deep neural network) is usable. The tablet 3 may use a CNN (conventional neural network) or an RNN (recurrent neural network) as the DNN. The tablet 3 may use an LSTM (long-short term model) as the RNN. When the tablet 3 uses a CNN, image data can be inputted to the model as data about the kind of musical instrument. Accordingly, the tablet 3, for example, can use the user's handwriting characters, and graphical images such as an icon, a photograph, etc. of the musical instrument as input data to the model. When the tablet 3 uses an RNN, the tablet 3 can use a name of musical instrument and a description of musical instrument as input data to the model. In this case, therefore, the tablet 3 can eliminate the need to change the name of musical instrument into label data to be applied to the model. Also, the tablet 3 can select mixing data for a musical instrument even if the user does not know the name of the musical instrument.

The flash memory 33 stores mixing data (about a channel name, a gain, a destination, a send level, etc.) for each kind of various audio sources (various names of musical instruments) that were set by the user in the past. For example, the tablet 3 uses various kinds of audio sources (various names of musical instruments) that were set by the user in the past as elements of input data, and uses mixing data as elements of output data. By using these input data and output data, the generated model considers the user's tendency or habit when he/she set mixing data with the tablet 3 in the past, and thereby learns the correlation (regularity) between each name of musical instrument and mixing data.

For example, generally, performers in a musical band listen to music while paying attention to a sound of a base guitar. In this case, the user sets the send level from an input channel for base guitar to each destination (each output channel that serves as an audio source of the sound each of the performers listens to) relatively high. At the learning stage, the kinds of audio sources in band performances are used as input data, and the send levels that the user used in the past for mixing data settings of band performances are used as output data. In this case, at the application stage, the learned model selects mixing data that includes an instruction to set the send level relatively high. Thus, when the identified kind of musical instrument is a base guitar, the tablet 3 selects mixing data that includes an instruction to set the send level relatively high.

At the learning stage, for example, the tablet 3 obtains a plurality of conditions, such as a performer's name, a user's name, a performance venue, etc., as input data. The tablet 3 selects mixing data based on these conditions, and sends the mixing data to the mixer 1 as output data. In this case, the learned model becomes one that depends on the conditions, such as a performer's name, a user's name, a performance venue, etc. For example, when a performer's name is inputted as input data at the learning stage, at the application stage, the mixing data acquisition section 362 considers the performer's habit in acquiring mixing data that includes data for effector settings of an input channel to which the sound played by the performer is inputted. Also, the mixing data acquisition section 362 acquires mixing data as desired by a performer for an output channel the performer listens to. Further, for example, when a user's name is inputted as input data at the learning stage, at the application stage, the mixing data acquisition section 362 acquires mixing data that the user, who is a mixing engineer, usually uses. For example, when a performance venue is inputted as input data at the learning stage, at the application stage, the mixing data acquisition section 362 acquires mixing data that allows reproduction of a sound field specific to the performance venue. For example, when the performance venue is a place where hauling or undulation is likely to occur in a specific frequency band, the mixing data acquisition section 362 acquires mixing data that includes equalizer setting to lower the gain in the frequency band.

Also, the tablet 3 may select mixing data based on the feature amounts of sound. In this case, at the learning stage, the tablet 3 uses the sound inputted into the channel as an element of input data. The tablet 3 uses mixing data (about a channel name, a gain, a destination, a send level, etc.) as elements of output data. In this way, the tablet 3 trains a model of selection of mixing data. At the stage of using the learned model, the mixing data acquisition section 362 uses the sound inputted to the channel as input data to the learned model, and acquires mixing data from the output data from the learned model. By using such a learned model, for example, the tablet 3 analyzes the feature amounts of the sound of an electric guitar and selects the most appropriate set of mixing data from among a plurality of sets of mixing data corresponding to an electric guitar.

When a large volume of mixing data are stored in the database, it becomes difficult for the user to select a set of mixing data appropriate for the kind of audio source among from the large volume of mixing data. Therefore, the tablet 3 automatically selects mixing data corresponding to the identified kind of audio source by using AI. Then, the user no longer dithers over selecting a set of mixing data appropriate for the kind of audio source, and it is possible to shorten the time for setting mixing data.

[Modification 4]

Figure 11:
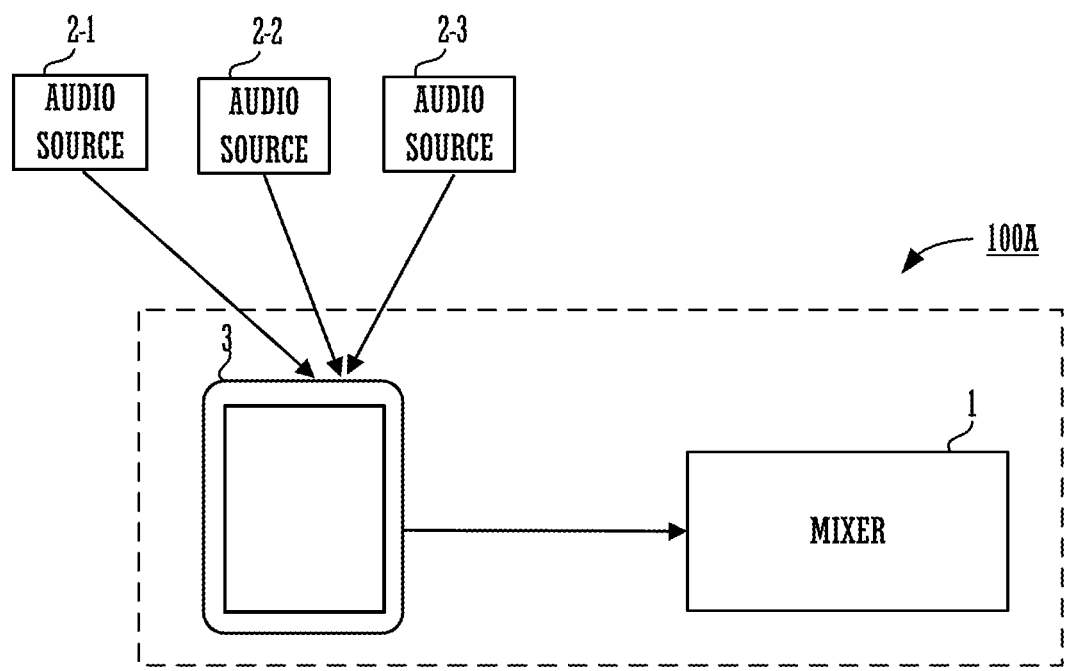
FIG. 11 is a configuration diagram showing the configuration of an audio system according to Modification 2.
Figure 12:
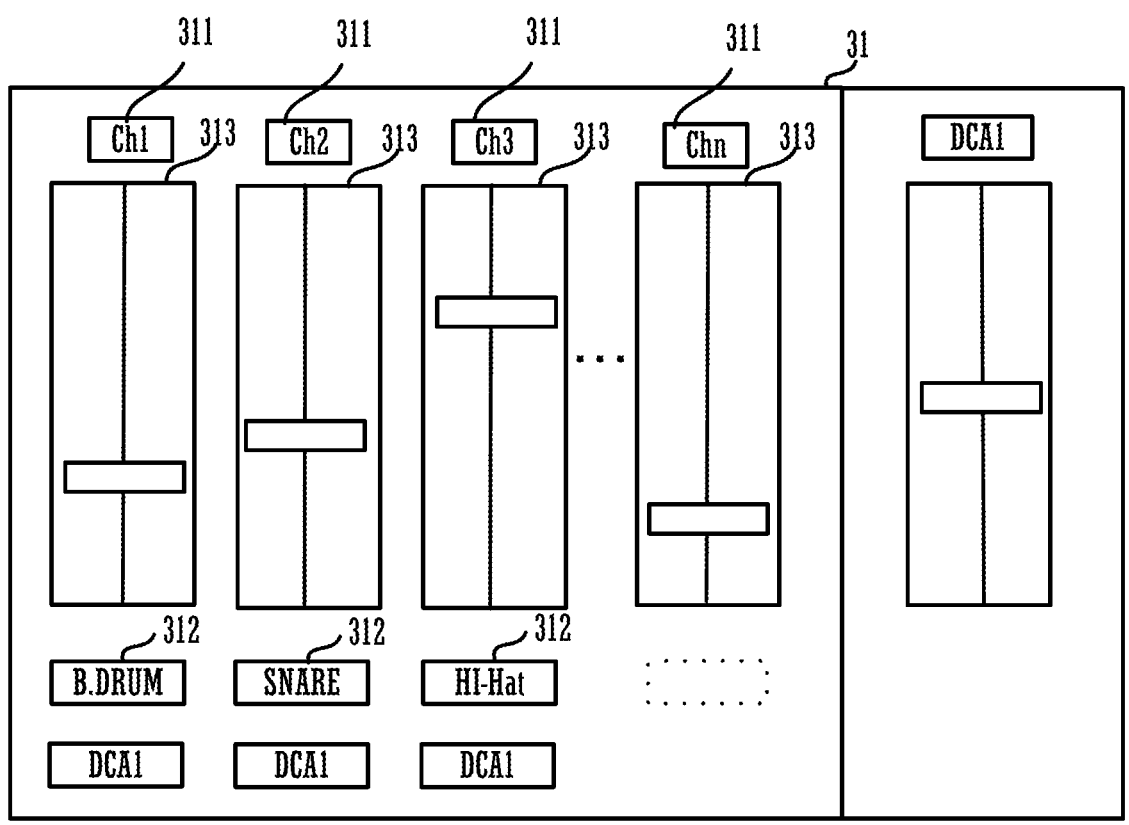
FIG. 12 is an illustration diagram showing an exemplary picture including a DCA (digital-controlled amplifier).

Au audio system 100A according to Modification 4 will be described with reference to FIGS. 11 and 12. FIG. 11 is a configuration diagram of the audio system 100A according to Modification 4. FIG. 12 is an exemplary picture including a DCA (digital-controlled amplifier). The same members as those of the tablet 3 in the above-described embodiment are provided with the same reference signs, and the descriptions there of will be omitted.

The DCA functions to adjust parameters (for example, send levels) of a plurality of channels at one time by using one fader while keeping the levels of the plurality of channels in balance. In this example, the tablet 3 adjusts the send levels of Channel 1, Channel 2 and Channel 3 at one time by using DCA 1.

In this example, as shown in FIG. 12, the send levels of a plurality of instruments composing a drum set (a base drum, a snare drum, and high-hat cymbals) are controlled at one time by using a fader of DCA 1. In this example, the mixing data include group definition data that defines a group of channels. The group definition data indicate which group each channel belongs to.

In a case in which the user set the tablet 3 in the past such that the send levels of the base drum, the snare drum and the high-hat cymbals could be controlled at one time by DCA 1, the tablet 3 operates as follows. In this case, the tablet 3 stores group definition data in the flash memory 33 as part of mixing data for each of the base drum, the snare drum and the high-hat cymbals, the group definition data indicating that the base drum, the snare drum and the high-hat cymbals belong to DCA 1.

The mixing data acquisition section 362 reads out, from the flash memory 33, the group definition data included in mixing data for the musical instrument identified as audio source 2-1 (base drum). The mixing data setting section 363 sends data about the channel selected by the user (in this example, Channel 1) and the mixing data including the group definition data to the mixer 1. The mixer 1 sets DCA 1 based on the group definition data such that Channel 1 (base drum) belongs to DCA 1 (DRUMS).

In a similar manner, when the audio source identification section 361 identifies a musical instrument of audio source 2-2 (snare drum), the mixing data acquisition section 362 reads out mixing data including group definition data indicating that the musical instrument belongs to DCA 1. The mixing data setting section 363 sends data about the channel selected by the user (in this case, Channel 2) and the mixing data including the group definition data to the mixer 1. The mixer 1 sets DCA 1 based on the group definition data such that Channel 2 (snare drum) belongs to DCA 1 (DRUMS).

Further, when the audio source identification section 361 identifies a musical instrument of audio source 2-3 (high-hat cymbals), the mixing data acquisition section 362 reads out mixing data including group definition data indicating that the musical instrument belongs to DCA 1. The mixing data setting section 363 sends data about the channel selected by the user (in this case, Channel 3) and the mixing data including the group definition data to the mixer 1. The mixer 1 sets DCA 1 based on the group definition data such that Channel 3 (high-hat cymbals) belongs to DCA 1 (DRUMS).

Based on the group definition data sent from the tablet 3, the mixer 1 sets Channel 1 (base drum), Channel 2 (snare drum) and Channel 3 (high-hat cymbals) in DCA 1.

Thus, according to Modification 4, the tablet 3 sends group definition data indicating that a plurality of channels belong to a DCA to the mixer 1, and accordingly, the mixer 1 automatically sets DCA. Therefore, the user does not need to set new DCA settings about a channel that was set in a DCA before by the user. This saves the user's time and effort for DCA settings, and the user can work efficiently.

When the tablet 3 according to Modification 3 is used in the system according to Modification 4, in this example, channel names are used as elements of input data at the learning stage. The tablet 3 judges from output data whether the corresponding input data (channel name) belong to a DCA. When it is judged from the output data that the corresponding input data belong to a DCA, the tablet 3 further learns the DCA number from the output data. At the application stage, the tablet 3 acquires mixing data from the output data from the learned model. In this modification, the model is applicable in the same manner as described in connection with Modification 3.

The tablet 3 may set group definition data beforehand (before the user uses the tablet 3). For example, mixing data indicating that a base drum, a snare drum, and high-hat cymbals are associated with DCA 1 may be stored in the flash memory 33 beforehand. In this case, when the user uses the tablet 3 for the first time, the musical instruments associated with a drum set are set in the same DCA.

[Modification 5]

Figure 13:
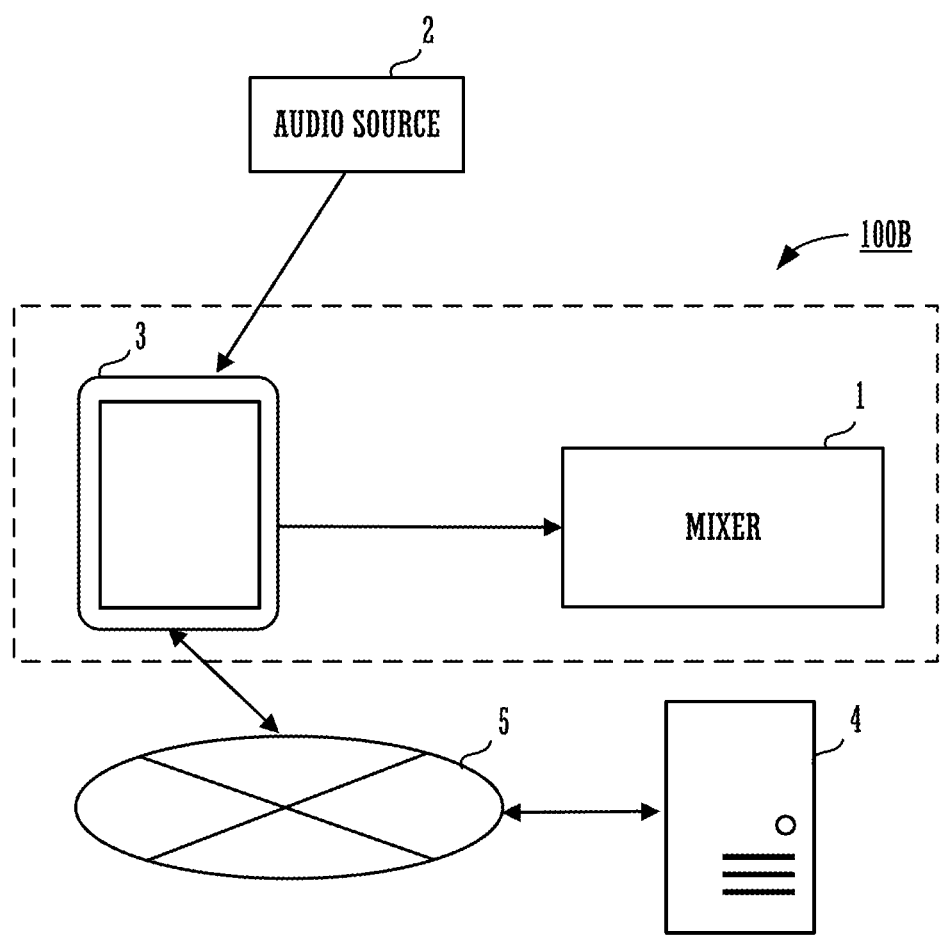
FIG. 13 is a configuration diagram showing the configuration of an audio system according to Modification 3.

An audio system 100B according to Modification 5 will be described with reference to FIG. 13. FIG. 13 is a configuration diagram showing an example in which the tablet 3 is connected to a server 4 via a network 5.

The network I/F 35 sends and receives various kinds of data from and to the server 4 via the network 5.

In this example, the server 4 communicates with a plurality of devices (a personal computer, a mixer, a tablet, etc.). From the plurality of devices, the server 4 receives data about kinds of musical instruments (names of musical instruments) and sets of mixing data respectively associated with the names of musical instruments. The server 4 stores the names of musical instruments and the sets of mixing data associated with the names of musical instruments in a database. The database may be inside the server 4 or may be structured in an external memory connected to the server 4.

The server 4 has a learning function. The server 4 leans regularity from the database that indicates the correlation between a plurality of names of musical instruments and mixing data by machine learning or deep learning, and selects appropriate mixing data by an algorithm constructed based on the regularity. The way of training a model of selection of mixing data (learning stage) and the way of generating mixing data by using the model (application stage) are the same as described in connection with the tablet 3 according to Modification 3, and the descriptions thereof are omitted. The tablet 3 according to Modification 3 mainly uses mixing data that have been set in the tablet 3 before as teaching data. The server 4 is different from the tablet 3 in that the server 4 uses mixing data that have been set in the plurality of devices connected to the server 4 as teaching data. The server 4 can make a learned model by using a large volume of teaching data, and therefore, the server 4 can make a more accurate and more robust model than the model made by the tablet 3 according to Modification 3.

For example, when the server 4 receives data indicating a name of musical instrument from the tablet 3, the server 4 searches for mixing data corresponding to the name of musical instrument in the database. In an exemplary algorithm, for example, the server 4 detects mixing data that have been used most often for the last one month. Then, the server 4 sends the mixing data as mixing data corresponding to the name of musical instrument to the tablet 3 that has sent the name of musical instrument.

In the database, a large volume of mixing data collected from many devices are stored, and therefore, the accuracy of the detection algorithm is dramatically improved as compared with a case of selecting an appropriate set of mixing data from among mixing data stored in the tablet 3. In this example, even when the tablet 3 does not store any history of using (setting) mixing data in the tablet 3 itself, the tablet 3 can obtain accurate mixing data from the server 4. Thus, since the tablet 3 is connected to the server 4, the tablet 3 can obtain more appropriate mixing data.

The server 4 does not only store sets of mixing data associated with names of musical instruments. The server 4 may receive an audio signal from the tablet 3 and may detect, in the database, an appropriate set of mixing data for the feature amounts of the audio signal. In this case, the server 4 extracts the feature amounts of the audio signal sent thereto and detects a set of mixing data appropriate for approximate feature amounts.

Alternatively, the server 4 may receive a channel name that the tablet 3 obtained by using an identified kind of musical instrument (name of musical instrument) and may detect, in the database, an appropriate set of mixing data for the channel name.

It should be understood that the present embodiment has been described as an example and that the description is not limiting. The scope of the present disclosure is not limited to the embodiment above and is determined by the claims. Further, the scope of the disclosure shall be deemed to include equivalents of the scope of the claims and all possible modifications within the scope.

The audio signal processing device according to the present disclosure may be a general-purpose data processing device such as, PC.

What is claimed is:

1. An audio signal processing device comprising:
    a communication section that communicates with an external mixing device;
    an input reception section that receives input from a user for selection of a channel of the external mixing device;
    an audio signal input section that receives an audio signal corresponding to the channel of the external mixing device selected according to the input from the user for the selection of the channel received at the input reception section;
    an audio source identification section that analyzes the audio signal received at the audio signal input section and identifies a kind of audio source of the audio signal;
    a setting data acquisition section that acquires setting data corresponding to the kind of audio source identified by the audio source identification section; and
    a setting data setting section that prompts, by communicating with the external mixing device via the communication section, the external mixing device to set the setting data acquired by the setting data acquisition section for the channel of the external mixing device selected according to the input from the user for the selection of the channel received at the input reception section.

2. The audio signal processing device according to claim 1, wherein the communication section is configured to further communicate with a server that obtains setting data corresponding to the kind of audio source, and
    wherein the communication section sends the kind of audio source to the server and receives the setting data corresponding to the kind of audio source from the server.

3. The audio signal processing device according to claim 1, wherein:
in a case where there are a plurality of sets of setting data, the input reception section receives input from the user for selection of a set of setting data from among the plurality of sets of setting data; and
the setting data setting section prompts, by communicating with the external mixing device via the communication section, the external mixing device to set the set of setting data, selected according to the input from the user for the selection of the set of setting data received at the input reception section, for the channel of the external mixing device selected according to the input from the user for the selection of the channel received at the input reception section.

4. The audio signal processing device according to claim 1,
wherein the setting data setting section associates the setting data with the channel of the external mixing device selected according to the input from the user for the selection of the channel received at the input reception section.

5. The audio signal processing device according to claim 1, further comprising a display that displays the kind of audio source identified by the audio source identification section in association with the channel of the external mixing device selected according to the input from the user for the selection of the channel.

6. The audio signal processing device according to claim 1, wherein the kind of audio source includes a name of a musical instrument.

7. The audio signal processing device according to claim 1, wherein the kind of audio source includes a vocal.

8. The audio signal processing device according to claim 1, wherein the setting data includes group definition data that defines a group of channels of the external mixing device.

9. The audio signal processing device according to claim 1, wherein:
the input reception section further receives input from the user for selection of performer data; and
the setting data acquisition section acquires setting data corresponding to the performer data selected according to the input from the user for the selection of the performer data received at the input reception section and the kind of audio source.

10. The audio signal processing device according to claim 1, wherein:
the input reception section further receives input from the user for selection of user data; and
the setting data acquisition section acquires setting data corresponding to the user data selected according to the input from the user for the selection of the user data received at the input reception section and the kind of audio source.

11. An audio system comprising:
an external mixing device that sets setting data for each of a plurality of channels of the external mixing device; and
an audio signal processing device including:
a communication section that communicates with the external mixing device;
an input reception section that receives input from a user for selection of a channel of the external mixing device from among the plurality of channels of the external mixing device;
an audio signal input section that receives an audio signal corresponding to the channel of the external mixing device selected according to the input from the user received at the input reception section;
an audio source identification section that analyzes the audio signal received at the audio signal input section and identifies a kind of audio source of the audio signal;
a setting data acquisition section that acquires setting data corresponding to the kind of audio source identified by the audio source identification section; and
a setting data setting section that prompts, by communicating with the external mixing device via the communication section, the external mixing device to set the setting data acquired by the setting data acquisition section for the channel of the external mixing device selected according to the input from the user received at the input reception section,
wherein:
the audio signal processing device is a general-purpose data processing device;
the audio signal processing device prompts, by communicating with the external mixing device via the communication section, the external mixing device to set the setting data for the channel selected at the input reception section; and
the external mixing device processes the audio signal for the channel of the external mixing device selected according to the input from the user received at the input reception section in accordance with the setting data set with the audio signal processing device.

12. An audio signal processing method performed by an audio signal processing device that comprises a communication section that communicates with an external mixing device, the audio signal processing method comprising:
receiving input from a user for selection of a channel of the external mixing device;
receiving an audio signal corresponding to the channel of the external mixing device selected according to the input received from the user for the selection of the channel;
analyzing the received audio signal and identifying a kind of audio source of the received audio signal;
acquiring setting data corresponding to the kind of audio source; and
prompting, by communicating with the external mixing device via the communication section, the external mixing device to set the setting data for the channel of the external mixing device selected according to the input received from the user for the selection of the channel.

13. The audio signal processing method according to claim 12, further comprising:
communicating, via the communication section, with a server that detects setting data corresponding to the kind of audio source; and
sending the kind of audio source to the server and receiving the setting data corresponding to the kind of audio source from the server.

14. The audio signal processing method according to claim 12, further comprising:
receiving, in a case where there are a plurality of sets of setting data, input from the user for selection of a set of setting data from among the plurality of sets of setting data; and prompting, by communicating with the external mixing device via the communication section, the external mixing device to set the set of setting data, selected according to the input from the user for the selection of the set of setting data, for the channel of the external mixing device selected according to the input received from the user for the selection of the channel.

15. The audio signal processing method according to claim 12, further comprising:
associating the setting data with the channel of the external mixing device selected according to the input received from the user for the selection of the channel.

16. The audio signal processing method according to claim 12, further comprising:
displaying the kind of audio source in association with the channel of the external mixing device selected according to the input received from the user for the selection of the channel.

17. The audio signal processing method according to claim 12, wherein the kind of audio source includes a name of musical instrument and a vocal.

18. The audio signal processing method according to claim 12, wherein the setting data includes group definition data that defines a group of channels of the external mixing device.

19. The audio signal processing method according to claim 12, further comprising:
receiving input from the user for selection of performer data; and
when the user selects performer data, acquiring setting data corresponding to the performer data selected according to the input from the user for the selection of the performer data and the kind of audio source.

20. The audio signal processing method according to claim 12, further comprising:
receiving input from the user for selection of user data; and
when the user selects user data, acquiring setting data corresponding to the user data selected according to the input from the user for the selection of the user data and the kind of audio source.

\* \* \* \* \*